G. A. COWEN.
MEASURING APPARATUS.
APPLICATION FILED JAN. 11, 1909.

941,359.

Patented Nov. 30, 1909.

Attest.
John B Linstrom
Charles W Kneath

Inventor,
George A. Cowen
by Geo. Willis Pierce
Attorney.

UNITED STATES PATENT OFFICE.

GEORGE A. COWEN, OF BOSTON, MASSACHUSETTS.

MEASURING APPARATUS.

941,359. Specification of Letters Patent. Patented Nov. 30, 1909.

Application filed January 11, 1909. Serial No. 471,569.

*To all whom it may concern:*

Be it known that I, GEORGE A. COWEN, residing at Boston, in the county of Suffolk and State of Massachusetts, have invented certain Improvements in Measuring Apparatus, of which the following is a specification.

The present invention relates to means for indicating the coefficient of linear expansion or contraction of tubular metal rods when the same are experiencing the effects of artificially applied heat or cold.

I prefer to employ the device in testing the effects of temperature upon hollow or tubular rods through which gases or fluids are caused to flow in an even manner, the rod being held at one end and free to move at its free end, and during the process means are provided to indicate upon a dial or scale the movement of the rod.

For further explanation of the invention, reference is had to the associated drawings, in which—

Figure 1:
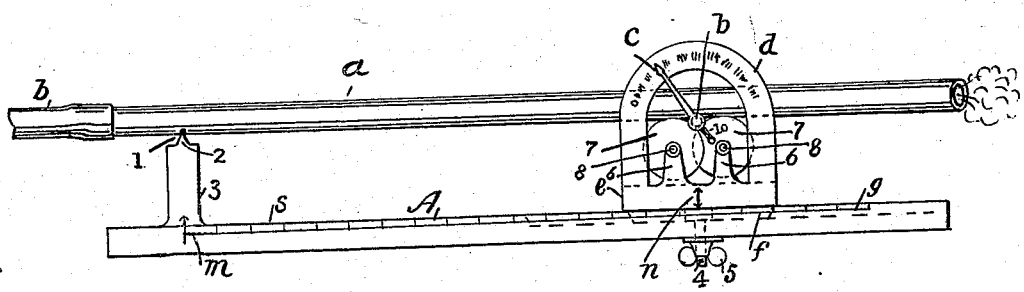
Figure 2:
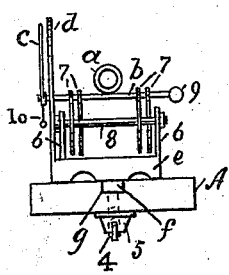
Figure 3:
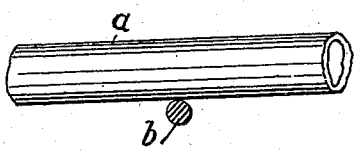

Figure 1 is a side view of an embodiment of the invention; Fig. 2 is an end view of the same; and Fig. 3 is an enlarged view of a detail.

In the drawings A represents a base plate, at one end of which is a standard 3 provided on its top with a sharp projection like a knife edge 2. At the opposite end of the base I provide in the center thereof a slot $g$ in which is adapted to slide a tongue $f$ attached to the carriage $e$ having on each side the standards 6, 6, which support the spindles 8, 8, secured to the ends of which are the disks or wheels 7, 7, 7, 7, overlapping one another; attached to the tongue $f$ is a screw provided with a thumb-nut by which the carriage can be secured to the frame at any desired point.

Resting upon the edges or peripheries of the disks or wheels 7, in the space where they overlap each other, to diminish the friction is a shaft or axle $b$ of known diameter having on one end a pointer $c$ balanced by an extension 10, and the axle is provided on the opposite end with a weight 9 to steady the axle and pointer. A dial or scale $d$ is secured to the carriage $e$, the upper circular part of which has its center in the axis of the axle $b$.

When a hollow rod $a$ is to be tested, say, to determine its coefficient of linear expansion, one end is secured to a tube $b$ connected to a source of steam, or other heated gas or fluid, and a nick 1 is made in one side of the rod in which the knife edge 2 is placed, thus taking the weight of one end of the rod whose opposite end is placed on the axle $b$ and the pointer $c$ is turned to zero on the dial. This position of the rod enables the expansion to take place toward its free end. As the steam passes through the tube, the heat thereof causes it to expand in the direction of its length and as it moves, it rotates the axle and the pointer by frictional pressure, and when it reaches the limit of expansion a reading is made of the pointer on the dial.

The coefficient of expansion is found in the following manner: Suppose that the diameter of the axle be 0.2 of a centimeter, its circumference will be $0.2 \times 3.1416 = .62832$. If the pointer has moved to 60° on the dial, the rod must have expanded 1/6 of the circumference of the axle $= .10472$ c. m. which is the expansion of the rod. From this the coefficient is found; *i. e.*, the expansion of a unit of length for one degree of change in temperature. In order that a certain or initial length of the rod may be known, I mark the double arrow $m$ at the center of the knife edge 2, and the double arrow $n$ on the carriage opposite the center of the axle $b$, and the distance between the two marks is the certain length.

It will be understood that I do not limit myself to the precise construction shown in the drawings, as it may be widely varied without departing from the spirit of the invention.

I have indicated a scale $s$ on the base A by which the initial length of the rods $a$ may be measured.

I claim as my invention—

1. A device to indicate the coefficient of linear expansion of a metal rod, said device comprising two supports both of which have exposed upper surfaces with which the rod may be operatively engaged by laying it on said supports, one of the supporting surfaces being fixed and adapted to engage one portion of the rod to hold it against longitudinal movement, the other supporting surface being movable to be actuated by frictional engagement with another portion of the rod and having an indicator operatively connected therewith.

2. A device to indicate the coefficient of linear expansion of a metal rod, said device comprising two supports both of which have exposed upper surfaces with which the rod may be operatively engaged by laying it on said supports, one of the supporting surfaces comprising a fixed standard having a sharp edge to engage one portion of the rod to hold it against longitudinal movement, the other supporting surface comprising a plurality of rotatably mounted disks and an axle provided with a pointer and resting on said disks, and a scale to coöperate with said pointer.

In testimony whereof, I have signed my name to this specification in the presence of two subscribing witnesses, this eighth day of January 1909.

GEORGE A. COWEN.

Witnesses:
  GEORGE F. PARTRIDGE,
  LEON C. COLMAN.